United States Patent
Kwon

[11] Patent Number: 5,825,099
[45] Date of Patent: Oct. 20, 1998

[54] UNINTERRUPTIBLE POWER SUPPLY CIRCUIT

[75] Inventor: Hun-Cheol Kwon, Gumi, Rep. of Korea

[73] Assignee: SamSung Electronics Co., Ltd., Suwon, Rep. of Korea

[21] Appl. No.: 732,747

[22] Filed: Oct. 18, 1996

[30] Foreign Application Priority Data

Oct. 18, 1995 [KR] Rep. of Korea ............... 1995-35967

[51] Int. Cl.⁶ .................................................. H02J 3/32
[52] U.S. Cl. .......................... 307/48; 307/44; 320/102; 320/118
[58] Field of Search ................................. 307/64, 66, 43, 307/44, 48, 65; 320/2, 39, 13, 23

[56] References Cited

U.S. PATENT DOCUMENTS

| | | | |
|---|---|---|---|
| 4,287,465 | 9/1981 | Godard et al. | 307/46 |
| 4,482,815 | 11/1984 | Orengo | 307/44 |
| 4,730,121 | 3/1988 | Lee et al. | |
| 4,763,014 | 8/1988 | Model et al. | 307/66 |
| 5,033,882 | 7/1991 | Vanderpool et al. | |
| 5,073,837 | 12/1991 | Baek | |
| 5,150,032 | 9/1992 | Ho | |
| 5,271,481 | 12/1993 | Narita et al. | 307/46 |
| 5,278,798 | 1/1994 | Miyawaki | |
| 5,300,874 | 4/1994 | Shimamoto et al. | |
| 5,408,170 | 4/1995 | Umetsu et al. | 320/39 |
| 5,418,445 | 5/1995 | Alpert et al. | |
| 5,440,179 | 8/1995 | Severinsky | |
| 5,471,114 | 11/1995 | Edwards et al. | 307/46 |
| 5,610,450 | 3/1997 | Sacki et al. | 307/44 |
| 5,650,669 | 7/1997 | Aldous | 307/46 |

*Primary Examiner*—Jeffrey A. Gaffin
*Assistant Examiner*—Albert W. Paladini
*Attorney, Agent, or Firm*—Robert E. Bushnell, Esq.

[57] ABSTRACT

An uninterruptible power supply circuit has a first power supply unit for supplying a first power supply voltage; a second power supply unit for supplying a second power supply voltage which is lower than the first power supply voltage; a back-up power supply unit for supplying a back-up power supply voltage; a charge current control unit for receiving the first power supply voltage and for controlling a charge current which is supplied to the back-up power supply unit according to a capacity of the back-up power supply unit; a reverse current protection unit connected between the second power supply unit and an output node connected to an output terminal; an overcharge protection unit connected between the back-up power supply unit and the output node, for protecting the back-up power supply unit from being overcharged; and a relay unit which is driven by the first power supply voltage and forms a path for outputting the back-up power supply voltage to the output node when the first power supply voltage is cut off.

10 Claims, 1 Drawing Sheet

UNINTERRUPTIBLE POWER SUPPLY CIRCUIT

CLAIM OF PRIORITY

This application makes reference to, incorporates the same herein, and claims all benefits accruing under 35 U.S.C. §119 from an application for Power Supply Voltage Supplying Circuit earlier filed in the Korean Industrial Property Office on the 18th day of Oct. 1995 and there duly assigned Serial No. 35967/1995.

BACKGROUND OF THE INVENTION

1. Field of the Invention

The present invention relates to uninterruptible power supply circuits, and more particularly to uninterruptible power supply circuits including a main power source and a back-up power source, the back-up power source being charged by the main power source.

2. Description of the Related Art

Generally, an uninterruptible power supply circuit is constructed with a main power source unit for supplying power during normal times and a back-up power source for supplying back-up power when the main power source is cut off. A battery which is charged by the main power source is used for the back-up power source.

In an earlier designs of circuits for an uninterruptible power supply, a first power supply voltage $V_1$ is supplied to an output node via a first diode. The first power supply voltage at the output node appears at an output terminal $V_0$ and is applied to simultaneously charge a back-up battery via a resistor. A second diode is connected between the back-up battery and the output terminal $V_0$ and is used as a reverse current protection diode for cutting off the path to the battery. When the first power supply voltage $V_1$ is lower than the voltage of the back-up battery, the back-up battery voltage is supplied to the output terminal $V_0$ via the second diode. The first diode is used as a reverse current protection for preventing the back-up power from being supplied to a first power supply circuit from which the first power supply voltage is supplied.

The back-up battery is charged by a voltage lower than the first power supply voltage and the back-up battery is not fully charged and is discharged via the second diode. Thus, if the back-up battery voltage which is lower than the turn on voltage of the second diode is discharged, the second diode is turned off and this causes a shorter discharge time and the incomplete discharging of the back-up battery.

Exemplars of recent attempts to provide uninterruptible power supplies include: U.S. Pat. No. 5,440,179 to Severinsky entitled UPS with Bi-Directional Power Flow, U.S. Pat. No. 5,418,445 to Alpert et al. entitled Switching Circuit For Simultaneous Rapid Battery Charge And System Operation, U.S. Pat. No. 5,300,874 to Shimamoto et al. entitled Intelligent Power Supply System For A Portable Computer, U.S. Pat. No. 5,278,798 to Miyawaki entitled Semiconductor Memory Device, U.S. Pat. No. 5,150,032 to Ho entitled Combined Charging And Supply Circuit, U.S. Pat. No. 5,073,837 to Baek entitled Low Voltage Protection Circuit, U.S. Pat. No. 5,033,882 to Vanderpool et al. entitled Circuit For Conserving Power Of A Backup Battery, U.S. Pat. No. 4,730,121 to Lee et al. entitled Power Controller For Circuits With Battery Backup. I have found that these circuits lack an ability to both obtain a full charge across a battery by controlling the charging voltage and to prolong the useful life of a back-up battery after power has been interrupted and the back-up battery has been placed into service.

SUMMARY OF THE INVENTION

An object of the present invention is, therefore, to provide an improved circuit for a power supply.

It is another object to provide an uninterruptible power supply circuit able to fully charge a battery by raising the charging voltage.

It is still another object to provide an uninterruptible power supply circuit which can lengthen the discharging time of a back-up battery after the power is cut off and the back-up battery has been placed into service.

To achieve these and other objects of the present invention, an uninterruptible power supply circuit is constructed with a first power supply unit for supplying a first power supply voltage; a second power supply unit for supplying a second power supply voltage that is lower in amplitude than the first power supply voltage; a back-up power supply unit for supplying a back-up power supply voltage; a charge current control unit for receiving the first power supply voltage and for controlling the charge current to be applied to the back-up power supply unit according to the capacity of the back-up power supply unit; a reverse current protection unit connected between the second power supply unit and an output node connected to an output terminal. An overcharge protection unit may be connected between the back-up power supply unit and the output node, for protecting the back-up power supply unit from being overcharged, and a relay unit driven by the first power supply voltage, may be connected to form a path for applying the back-up power supply voltage to the output node when the first power supply voltage is cut off.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
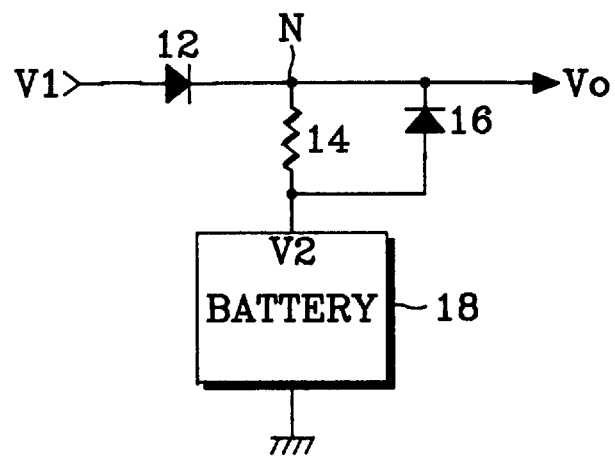
FIG. 1 is a circuit diagram showing an exemplar of an earlier uninterruptible power supply circuit.

Turning now to the drawings, FIG. 1 shows an earlier uninterruptible power supply circuit. If a first power supply voltage $V_1$ is at a normal level, it is supplied to a node N via a diode 12. The power supply voltage at the node N is output to an output terminal $V_o$ and is also used to simultaneously charge a battery 18 via a resistor 14. A diode 16 is used as a reverse current protection diode for cutting off the path to battery 18. If the first power supply voltage $V_1$ is at an abnormal level, i.e., if the first power supply voltage $V_1$ is lower than a back-up voltage $V_2$ of battery 18, the back-up power $V_2$ is supplied to the output terminal $V_o$ via the diode 16. Diode 12 is used as a reverse current protection diode for preventing the back-up voltage $V_2$ from being supplied to a first power supply circuit (not shown) from which the first power supply voltage $V_1$ is supplied. Battery 18 is charged by a voltage lower than the first power supply voltage $V_1$. Battery 18 is not fully charged and is discharged via the diode 16. Thus, if the back-up voltage $V_2$ of the battery 18 which is lower than the turn-on voltage of the diode 16 is discharged, then the diode 16 is turned off. This causes a shorter discharging time and an incomplete discharging of the battery 18.

Figure 2:
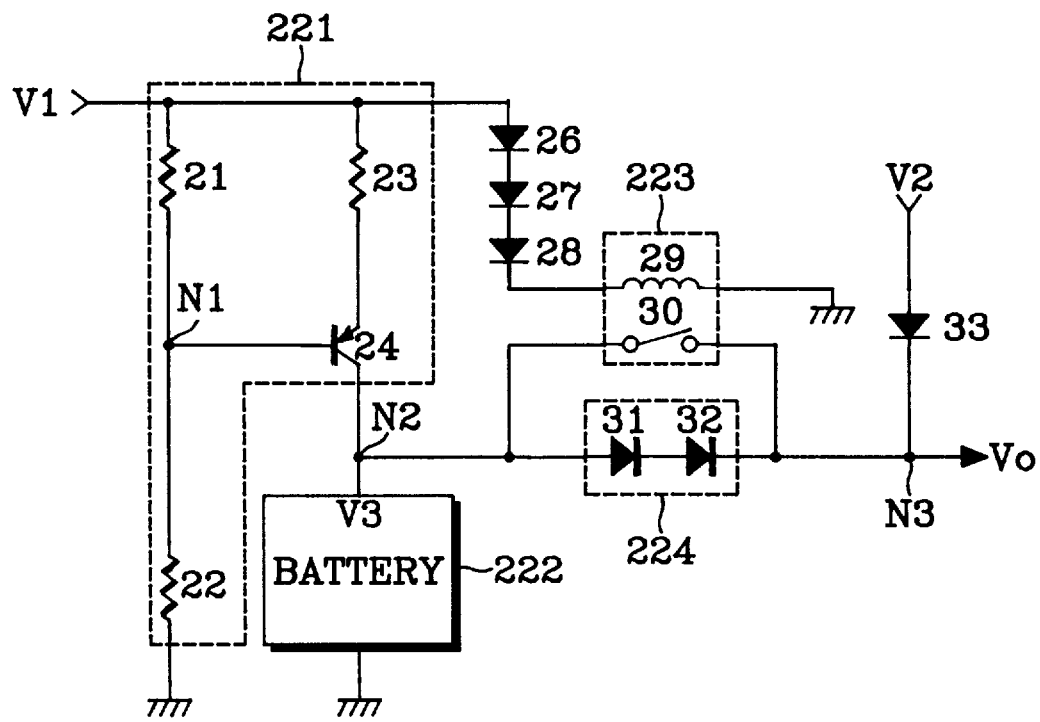
FIG. 2 is a circuit diagram showing an uninterruptible power supply circuit constructed according to the principles of the present invention.

As shown in FIG. 2, a first power supply voltage $V_1$ is supplied to a charge current control unit 221. The charge current control unit 221 is connected to a battery 222 via a node $N_2$ and controls the amount of the charge current according to the capacity of the battery 222. The battery 222 is charged by the first power supply voltage $V_1$ via the charge current control unit 221. A second power supply voltage $V_2$ is supplied to an output node N via a diode 33 and then is output to an output terminal $V_o$. An overcharge protection unit 224 connected between the node $N_2$ and the output node $N_3$ is composed of diodes 31 and 32 and functions to protect the battery 222 from being overcharged. A relay unit 223 which inputs the first power supply voltage $V_1$ as a driving power has a relay driver coil 29 and a relay contract switch 30. If the first power supply voltage $V_1$ is supplied to the coil 29, then the switch 30 is opened, while if the first power supply voltage $V_1$ is cut off, then the switch 30 is closed.

Firstly, a discussion follows for the case in which first and second power supply voltages of normal levels are supplied to the charge current control unit 221 and the diode 33, respectively. The first power supply voltage $V_1$ is supplied to resistors 21 and 23 and a diode 26. A dividing voltage $V_{N1}$ obtained by voltage-dividing the first power supply voltage $V_1$ by the resistors 21 and 22 is applied to the base of a PNP transistor 24 (assuming that the base current of the transistor 24 is small in comparison with the current through the resistors 21 and 23). The resistance values of the resistors 21 and 22 are set such that the PNP transistor 24 can be turned on by the dividing voltage $V_{N1}$. The first power supply voltage $V_1$ is supplied to the emitter of the turned-on PNP transistor 24 via the resistor 23. The battery 222 is then charged by the first power supply voltage $V_1$. The first power supply voltage $V_1$ passes through the diodes 26, 27 and 28 and drives the coil 29, thereby opening the switch 30. The battery 222 is charged by the power supply voltage which is higher than the voltage at the output node $N_3$ by the turn-on voltage level of the diodes 31 and 32. The reason is that is the battery 222 is discharged when a power supply voltage higher than the voltage at the output node $N_3$ plus the turn-on voltage of the diodes 31 and 32 is supplied to the battery 222. The power supply voltage obtained by subtracting the turn-on voltage of the diode 33 from the second power supply voltage $V_2$ is supplied to the output terminal $V_o$. The subtracted power supply voltage is the power supply voltage of the output node $N_3$.

Secondly, a discussion follows for the case in which first and second power supply voltages of abnormal levels are supplied to the charge current control unit 221 and the diode 33. If the first power supply voltage $V_1$ is cut off, no circuit flows in the coil 29 and thus the switch 30 is closed. The back-up power supply voltage $V_3$ of the battery 222 is supplied to the output node $N_3$ via the node $N_2$ and the closed switch 30. The back-up power supply voltage $V_3$ supplied to the output node $N_3$ is not discharged to a second power supply unit (not shown) by the diode 33. In this case, the diode 33 is used as a reverse current protection diode. The discharging operation continues until the battery 222 becomes completely discharged. Thereafter, if the first power supply voltage $V_1$ is supplied to a completely discharged battery 222, the maximum charge current is limited by the resistors 21, 22 and 23, thereby protecting the battery 222.

As described above, it is possible to fully charge the battery by raising the level of the back-up power supply voltage and it is also possible to increase the discharging time of the battery, thereby enabling the complete discharge of the battery, by using the closing of the switch 30. In addition, the expected life span of the battery can be extended by protecting the battery from being overcharged While there has been illustrated and described what is considered to be a preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An uninterruptible power supply circuit, comprising:
   a first power supply unit for supplying a first power supply voltage;
   a second power supply unit for supplying a second power supply voltage which is lower than said first power supply voltage;
   a back-up power supply unit for supplying a back-up power supply voltage;
   a charge current control unit for receiving said first power supply voltage and for controlling a charge current supplied to said back-up power supply unit according to a capacity of said back-up power supply unit;
   a reverse current protection unit connected between said second power supply unit and an output node connected to an output terminal of the uninterruptible power supply circuit;
   an overcharge protection unit connected between said back-up power supply unit and said output node, for protecting said back-up power supply unit from being overcharged; and
   a relay unit driven by said first power supply voltage and forming a path for dire applying said back-up power supply voltage to said output node when said first power supply voltage is cut off.

2. The uninterruptible power supply circuit as claimed in claim 1, wherein said relay unit comprises:
   a relay driving part driven by said first power supply voltage; and
   a relay contact part connected in parallel with said overcharge protection unit, said relay contact part being an open circuit when said relay driving part is driven by said first power supply voltage and being a closed circuit otherwise.

3. The uninterruptible power supply circuit as claimed in claim 1, wherein said charge current control unit comprises:
   a voltage-dividing part, including first and second resistors, for voltage-dividing said first power supply voltage and generating a divided voltage;
   a transistor having a control electrode regulating electrical conduction via a principal electrically conducting channel between electrically conducting on and electrically non-conducting off states in response to said divided voltage supplied to said control electrode, and having a second s electrode coupled between said channel and said back-up power supply; and
   a third resistor coupled between said first means and a third electrode electrically separated from said second electrode by said channel, said resistance controlling a maximum charge current through said third electrode.

4. The uninterruptible power supply circuit as claimed in claim 2, wherein said charge current control unit comprises:

a voltage-dividing part, including first and second resistors, for voltage-dividing said first power supply voltage and generating a divided voltage;

a transistor having a control electrode regulating electrical conduction via a principal electrically conducting channel between electrically conducting on and electrically non-conducting off states in response to said divided voltage supplied to said control electrode, and having a second electrode coupled between said channel and said back-up power supply; and a third resistor coupled between said first means and a third electrode electrically separated from said second electrode by said channel, said resistance controlling a maximum charge current through said third electrode.

5. An uninterruptible power supply circuit, comprising:

first receiving means, said first receiving means receiving a first power supply voltage;

second receiving means, said second receiving means receiving a second power supply voltage, said second power supply voltage being lower than said first power supply voltage;

a back-up power supply for supplying a back-up power supply voltage;

a back-up power supply charger for charging said back-up power supply with said first power supply voltage;

a reverse current protector connected between said second means for receiving said second power supply voltage and an output terminal of the uninterruptible power supply circuit;

an overcharge protector connected between said back-up power supply and said output terminal, for protecting said back-up power supply from being overcharged; and a control switch driven by said first power supply voltage and forming a path for directly outputting said back-up power supply voltage to said output terminal in an absence of said first power supply voltage.

6. An uninterruptible power supply circuit as claimed in claim 5, wherein said control switch comprises:

a relay including a driving portion driven by said first power supply voltage and a relay contact portion connected in parallel with said overcharge protector, said relay contact portion being an open circuit when said relay driving portion is driven by said first power supply voltage and being a closed circuit otherwise.

7. An uninterruptible power supply circuit as claim in claim 5, wherein said charger comprises:

a voltage divider electrically coupled across said first power supply voltage to provide a divided voltage;

a transistor having a control electrode regulating electrical conduction via a principal electrically conducting channel between electrically conducting on and electrically non-conducting off states in response to said divided voltage supplied to said control electrode, and having a second electrode coupled between said channel and said back-up power supply; and a resistance coupled between said first means and a third electrode electrically separated from said second electrode by said channel, said resistance controlling a maximum charge current through said third electrode.

8. An uninterruptible power supply circuit as claim in claim 6, wherein said charger comprises:

a voltage divider electrically coupled across said first power supply voltage to provide a divided voltage;

a transistor having a control electrode regulating electrical conduction via a principal electrically conducting channel between electrically conducting on and electrically non-conducting off states in response to said divided voltage supplied to said control electrode, and having a second electrode coupled between said channel and said back-up power supply; and a resistance coupled between said first means and a third electrode electrically separated from said second electrode by said channel, said resistance controlling a maximum charge current through said third electrode.

9. A process for providing an uninterruptible power supply voltage, comprising:

providing a first power supply voltage;

providing a second power supply voltage lower in amplitude than said first power supply voltage;

providing a source of a back-up power supply voltage;

charging said source of back-up power supply voltage with a controlled charge current driven from said first power supply voltage;

providing at an output terminal exhibiting said uninterrupted power supply voltage, reverse current protection between said second power supply voltage and an output terminal;

providing overcharge protection for protecting said source of back-up power from being overcharged; and directly connecting the back-up power supply voltage to said output terminal when the first power supply voltage is cut off.

10. The process of claim 9, comprised of charging said source of back-up power supply voltage by:

dividing said first power supply voltage to provide a divided voltage;

applying said divided voltage to a transistor having a control electrode regulating electrical conduction via a principal electrically conducting channel between electrically conducting on and electrically non-conducting off states in response to application of said divided voltage to said control electrode, said transistor having a second electrode coupled between said channel and said back-up power supply; and coupling a resistance between a terminal receiving said first power supply voltage and a third electrode electrically separated from said second electrode by said channel, to control charge current flowing through said third electrode.

* * * * *